United States Patent [19]
Sifakas

[11] 3,857,226
[45] Dec. 31, 1974

[54] THATCHER

[76] Inventor: Costas Sifakas, 4803 Arcadia Rd., Holiday, Fla. 33589

[22] Filed: Oct. 11, 1073

[21] Appl. No.: 405,589

[52] U.S. Cl............................ 56/295, 56/17.5, 56/193
[51] Int. Cl............................................... A01d 55/18
[58] Field of Search ............. 56/400, 295, 193, 17.5, 56/16.1, 400.04; 248/214, 215

[56] References Cited
UNITED STATES PATENTS

| | | | |
|---|---|---|---|
| 2,863,162 | 12/1958 | Draughon | 56/295 X |
| 3,015,929 | 1/1962 | Bright | 56/193 |
| 3,117,633 | 1/1964 | Hosek | 56/295 X |
| 3,184,903 | 5/1965 | Fjelslad | 56/17.5 |
| 3,511,036 | 5/1970 | Julian | 56/17.5 |
| 3,611,683 | 10/1971 | Swenson | 56/16.1 |
| 3,611,691 | 10/1971 | Howard | 56/29.5 |
| 3,753,341 | 8/1973 | Berg, Jr. et al. | 56/400.04 |

*Primary Examiner*—Russell R. Kinsey
*Attorney, Agent, or Firm*—Stein and Orman

[57] ABSTRACT

A device designed to be removably and adjustably attached to the rotary blade of a conventional power lawn mover and designed to treat grass lawns by thinning out the dead or damaged grass therefrom. At least one cutting element including an elongated finger is positioned in ground engaging relation to said blade and is fastened thereto by a first and second operatively engaging bracket adjustable relative to one another to fit the width of various blades and to be positioned along the longitudinal axis from the center thereof. An anchor means comprising a one piece mass of flexible material is connected to the cutting finger and is correspondingly configured to be securely engaged and at least partially surrounded by an anchor housing which is part of said bracket means.

10 Claims, 7 Drawing Figures

PATENTED DEC 31 1974  3,857,226

THATCHER

BACKGROUND OF THE INVENTION

1. Field of the Invention

A device used to aerate lawns comprising a flexibly mounted cutting element having a protruding finger arranged substantially perpendicular to the plane of a rotary blade and adjustably attached thereto in predetermined locations.

2. Description of the Prior Art

A number of prior art devices are presently available on the market which are intended to enhance the appearance of a grass lawn. A number of these devices are particularly designed to aerate the lawn by cutting or puncturing the ground in order to bring air and oxygen to the roots of the grass. Other devices also designed to aerate grass and other vegetation are primarily designed to "thatch" or thin out the lawn through the removal of dead or damaged grass. However, in treating lawns the majority of the implements or tools available to the average home owner are overly complicated and unnecessarily expensive.

While recognizing that a well kept attractive lawn is highly desirable, the average home owner cannot indulge in the purchase of sophisticated equipment directly to perform the relatively frequent treatment of aeration of his lawn. Accordingly, there has been a need for a tool which either accomplishes a plurality of functions or which can be adapted to an already existing tool such as a lawnmower or the like.

While various argicultural implements have been designed to overcome the problems set forth above, the greater majority have not been able to accomplish both efficient operation and simplicity in installation. More particularly, thatching devices including a separate blade have been designed to be attached to a conventional lawnmower or other machines. However, installation of these devices necessitates the user to follow a rather complicated procedure. In addition, the necessity of using a separate rotary blade resulting in added expense has also been required. In installing these prior art devices it is required that the conventional rotary blade be removed, and the special thatcher rotary blade be substituted therefor and readjusted such that the entire body of the mower is repositioned relative to the surface or ground over which the mower travels.

In addition, none of the prior art thatcher's presently on the market have the capability of automatically picking up or directing the thatched dead grass into a disposal area. According to modern agricultural techniques the removal of this dead grass, etc. is quite important for efficient growth. With prior art devices this removal would have to be conducted by separate raking thus requiring an additional procedure and accordingly added expense.

Therefore, it is readily apparent that there is a need in the industry for a relatively simple, inexpensive and easy to maintain thatcher which is attachable to a conventional rotary lawnmower or like implement without removal of the conventional cutting blade of such a rotary mower. Such attachment means should have a construction capable of sufficient versatility to allow adjustable attachment to any given size blade while at the same time be securely attached to the blade so as to insure that the thatcher will not become inadvertently removed during use.

SUMMARY OF THE INVENTION

This invention relates to an agricultural implement, and more particularly a device known as a thatcher. The thatcher of the subject invention is of the type designed to be removably and adjustably attached to a conventional rotary blade of a power lawnmower.

More specifically, the thatcher implement of the present invention comprises a cutting means in the form of a substantially rigid, elongated finger movably or flexibly attached to the blade so as to provide a predetemined amount of flexure or "give" as the rigid finger engages the surface being thatched.

One embodiment of the present invention comprises the attachment means including a first and a second bracket movably connected to one another and specifically configured and disposed relative to one another so as to be oriented in a substantially transverse relationship to the longitudinal axis of the rotary blade. In addition, the opposite end of each first and second bracket are configured to overlap in a "gripping" fashion the opposite longitudinal edges of the blade so as to securely lock or fasten the thatcher to the blade where desired. In actual operation, one thatcher element is attached to opposite ends of the conventional rotary cutting blade in spaced relation to the respective extremity thereof. Since each of the thatcher elements in any of the respective embodiments to be described hereinafter are essentially the same, one thatcher element will be referred to. It should be noted, however, that when discussing any given embodiment, actual operation of a rotary lawnmower would normally incorporate the use of two thatcher elements mounted on opposite ends of the cutting blade in corresponding location to one another so as to provide proper balance to the blade as it rotates.

As described above, the first and second brackets are removably attached to one another by a connector which is arranged in movable engagement with each of the brackets so as to allow relative movement therebetween and accordingly provide an adjustable means of engaging or securing the first and second bracket to the rotary blade. In this way, the brackets may be mounted on blades of varying width merely by adjusting the connector which, as stated above, interconnects in locking engagement each of the first and second brackets with one another and with the rotary blade itself.

The implement of the subject invention further comprises an anchor which includes a mass of flexible, yielding material having a predetermined shape and at least partially surrounded by at least the first or second bracket means comprising the attachment means. The anchor may be formed of a solid, one piece mass of flexible material having one end of the cutting finger imbedded therein so as to eliminate the possibility of the cutting finger breaking loose or becoming inadvertently disassociated from the anchor and/or bracket to which it is attached. The anchor is configured and disposed so as to be forced into abutting engagement with the undersurface of the blade. As briefly explained above, by virtue of the flexible nature of the material used to define the anchor, the cutting finger is allowed to "flex" or yield somewhat as it engages the ground or surface area being thatched.

Another embodiment of the present invention comprises the attachment means including a single bracket element having an anchor housing formed therein in corresponding configuration as the anchor itself. As in the previous embodiment, the anchor is forced into abutting engagement with the undersurface of the rotary blade. Securing of the single bracket means to the rotary blade is accomplished by a connector element extending through an aperture in a tail portion of the first bracket and through an aligned aperture formed in the rotary blade itself. This connector element may be a conventional threaded combination screw and nut assembly. The opposite end of the bracket means again may be configured into an integral flange extending over the correspondingly positioned longitudinal edge of the blade so as to provide a gripping action thereon.

Another structural feature of the present invention, utilized primarily with the formally described embodiment of the attachment means comprises a locking means in the form of a spring element movably connected to the attachment means such that its midportion engages a groove in the head of the connector element interconnecting the first and second bracket means. The opposite end of the spring safety lock assembly comprises two free ends imbedded in or securely attached to an upper portion of the housing. Compression of the sides of the spring towards one another allows for sufficient "slack" in order to allow adjustment of the connector. When in locking engagement, positioning of the spring body within the slot within the connector prevents its rotation inadvertently such as during vibration.

In utilizing the device of the present invention, installation is made extremely simple and removal of the blade is eliminated. Also, the device itself is long lasting, efficient and inexpensive to purchase and/or maintain.

The invention accordingly comprises an article of manufacture possessing the features, properties and relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTIONN

Figure 1:
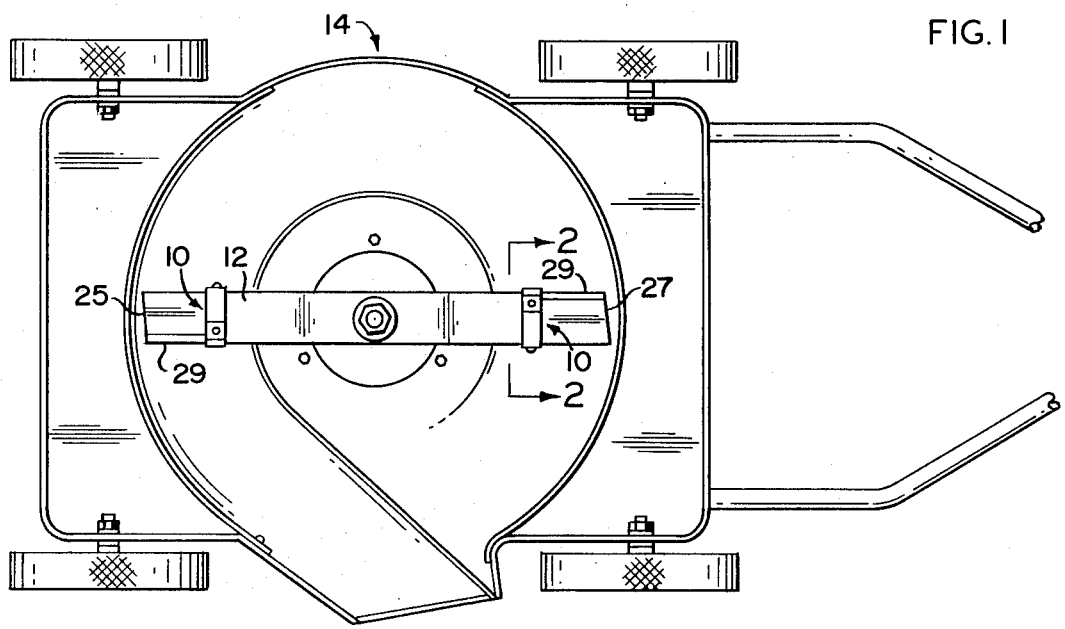
FIG. 1 is a bottom view showing the agricultural implement of the present invention installed on the rotary blade of a conventional lawnmower.
Figure 3:
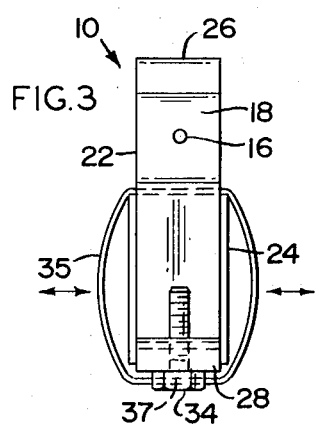
FIG. 3 is a rear plan view of the implement of FIG. 2 showing details of the adjustable attachment means.
Figure 2:
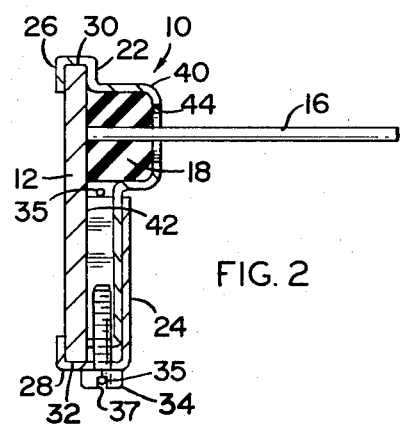
FIG. 2 is an enlarged sectional view taken along lines 2—2 of FIG. 1 showing the subject implement and attaching means mounted on the blade.
Figure 4:
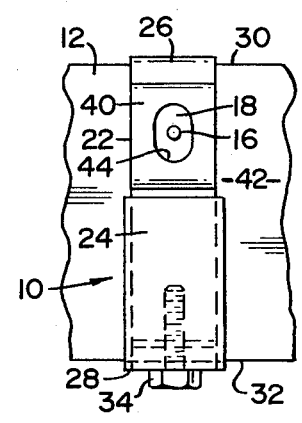
FIG. 4 is a front plan view of the implement of FIG. 2.

This invention relates to an agricultural implement commonly known as a thatcher and generally indicated as 10 in FIGS. 1, 2 and 3. The structure of thatcher 10 allows it to be mounted on opposite ends of a conventional rotary blade 12 used on power lawnmowers or the like, generally indicated as 14 in FIG. 1. As set forth above, this eliminates the necessity of removing the entire blade and/or cutting assembly of a conventional mower when a thatching operation is desired. More particularly, with reference to FIGS. 2, 3 and 4, the thatcher 10 comprises a cutting or raking element 16 in the form of a substantially elongated finger being rigid and being connected to an anchor element 18. The anchor element 18 may be formed from a unitary, solid mass of flexible material such as rubber or the like. As shown, the finger 16 extends through the entire anchor and engages the surface 42 of blade 12. The particular orientation is important for stability of finger 16 when engaging the surface being thatched. The attachment means itself comprises a first bracket 22 and a second bracket 24. Each of the brackets include grip means 26 and 28 including integrally formed flanges specifically configured to lockingly engage opposite longitudinal edges 30 and 32 of blade 12. The orientation of the first and second bracket, 22 and 24 respectively, defines the position of the attachment means as being substantially transverse to the longitudinal axis of the blade 12.

Referring back to FIG. 1, the placement of the implement or thatcher 10 is arranged in spaced relation to opposite extremities 25 and 27 of blade 12 substantially adjacent to the cutting portion 29 of opposite ends of the blade. By virtue of this placement and the natural configuration of the conventional cutting blade 12, the material thatched, including loose grass, etc. will automatically be swept up and can be deposited in a portable bag or like, similar to the process utilized when regular mowing occurs.

Referring back to FIGS. 2 and 3, a connector element 34 is movably interconnected between overlapping portions of the first bracket 22 and the second bracket 24. As can be seen clearly in FIG. 2 adjustment of the connector element 34, which may be a conventional screw threaded fastener, provides relative movement between the first and second bracket which allows for the varying width of blade 12 and the adaptation of the thatcher of the present invention to any conventional rotary blade of varying widths.

As best shown in FIGS. 2 and 3, the first bracket 22 includes an anchor housing 40 configured to at least partially surround or enclose the anchor means 18. By virtue of this arrangement, the anchor 18 is forced into abutting engagement with the undersurface 42 of blade 12. An aperture 44 is formed in housing 40 and allows for protrusion of finger 16 from the anchor 18 itself outwardly as shown in FIG. 2.

Referring to FIG. 3, one embodiment of the present invention includes a locking means in the form of a spring lock 35 designed to engage slot 37 in hex head 34. This engagement prevents inadvertant rotation of hex head 34. Removal of the base of spring 35 is accomplished by movement of the legs of spring 35 inwardly and outwardly as shown by the directional arrows in FIG. 5.

Figure 5:
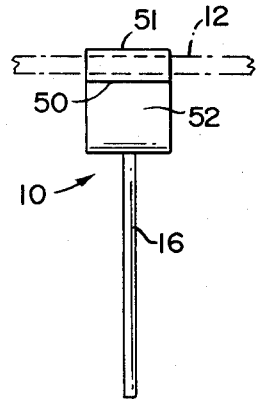
FIG. 5 is an end view of another embodiment of the attachment means.
Figure 6:
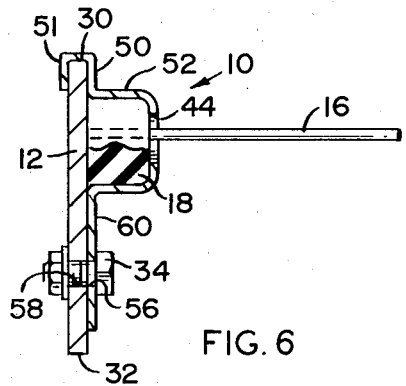
FIG. 6 is a sectional view similar to FIG. 2 of another embodiment of the attachment means utilized in the present invention.
Figure 7:
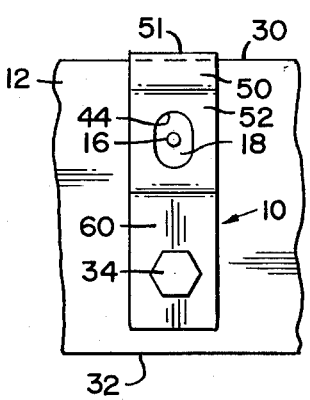
FIG. 7 is a front plan view of the implement attached directly to the connecting aperture in the blade.

Another embodiment of the present invention comprises the attachment means as shown in FIGS. 5, 6 and 7 including a single bracket 50 having an anchor housing 52 which at least partially surrounds the anchor 18 and also includes aperture 44 for the protrusion therethrough of the finger 16. The one end of bracket 50 includes a gripping means 51 in the form of an integrally formed flange configured to at least partially surround the blade 12. The opposite end of the flange 60 is defined by a tail portion 60 and has an aperture 56 formed therein. This aperture is aligned with an aperture 58 in the blade 12 itself. These two apertures define a mounting means for bracket 50 along with connector 34 which serves to secure the bracket 50 to blade 12 as shown in FIG. 6.

It will thus be seen that the objects made apparent from the preceding description, are efficiently attained and, since certain changes may be made in the above article without departing from the scope of the invention, it is intended that all matter contained in the above description or shown in the accompanying drawings shall be interpreted as illustrated and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An agricultural implement designed to be used as a thatcher in combination with a rotary blade of a lawnmower, said implement comprising: a raking means, attachment means mounted on said blade in predetermined spaced distance from one end thereof, anchor means securely fastened to said raking means, said attachment means comprising a first and a second bracket movably engaging one another and interconnecting the blade and said anchor means.

2. An agricultural implement as in claim 1 wherein said first and said second bracket are movably connected to one another and oriented to dispose said attachment means substantially transverse to the longitudinal axis of the blade.

3. An agricultural implement as in claim 1 further comprising grip means formed on one end of each bracket and disposed adjacent a longitudinal edge of said blade, said grip means configured to lockingly engage a correspondingly positioned longitudinal edge.

4. An agricultural implement as in claim 3 further comprising connector means movably interconnected between said first and second bracket, whereby adjustment of said connecting means allows relative movement between said first and second bracket and dimensioning of said attachment means to correspond to the width of the rotary blade.

5. An agricultural implement as in claim 1 wherein said attachment means further comprises an anchor housing formed in one of said first or second bracket and configured to at least partially surround said anchor and position it in substantially abutting engagement with the rotary blade.

6. An argicultural implement as in claim 1 wherein said raking means comprises a substantially elongated, rigid finger, one end of said finger imbedded in said anchor; said anchor comprising a substantially solid, unitary mass of flexible material whereby said finger is movably connected to said anchor.

7. An agricultural implement as in claim 1 further comprising a lock means including a spring element movably mounted on said attachment means and disposed to engage a conductor element which interconnects said first and second bracket, whereby rotation of said connector element is restricted upon engagement with said spring.

8. An agricultural implement as in claim 7 wherein said spring element comprises a pair of legs normally biased in outwardly spaced relation to said bracket, a base interconnecting said spring legs and positioned to engage said connector means when said legs are in a normally biased position.

9. An agricultural implement designed to be used as a thatcher in combination with a rotary blade of a lawnmower, said implement comprising a raking means, attachment means mounted on the blade, said attachment means comprising a single bracket disposed on said blade in substantially transverse relation to the longitudinal axis thereof, anchor means attached to said raking means and disposed between said blade and a portion of said bracket; said bracket including an anchor housing configured to at least partially surround said anchor, bracket mounting means comprising aligned apertures formed in said one bracket and the blade respectively, connecting means extending through said aligned apertures, and grip means integrally formed on said one bracket and configured to lockingly engage one longitudinal edge of the blade.

10. An argicultural implement as in claim 9 wherein said cutting means comprises a substantially elongated, rigid finger, one end of said finger imbedded in said anchor; said anchor comprising a substantially solid, unitary mass of flexible material, whereby said finger is movably connected to said anchor.

* * * * *